US007496344B2

(12) United States Patent
Stadelmann et al.

(10) Patent No.: US 7,496,344 B2
(45) Date of Patent: *Feb. 24, 2009

(54) METHOD AND SYSTEM FOR GSM BILLING DURING WLAN ROAMING

(75) Inventors: Toni Stadelmann, Bolligen (CH);
Michael Kauz, Lausanne (CH); Jeremy Richard Conn, Bern (CH)

(73) Assignee: Togewa Holding AG, Bern (CH)

( * ) Notice: Subject to any disclaimer, the term of this patent is extended or adjusted under 35 U.S.C. 154(b) by 742 days.

This patent is subject to a terminal disclaimer.

(21) Appl. No.: 10/523,004

(22) PCT Filed: Oct. 8, 2002

(86) PCT No.: PCT/CH02/00559

§ 371 (c)(1),
(2), (4) Date: Feb. 1, 2005

(87) PCT Pub. No.: WO2004/017565

PCT Pub. Date: Feb. 26, 2004

(65) Prior Publication Data

US 2006/0004643 A1     Jan. 5, 2006

(30) Foreign Application Priority Data

Aug. 16, 2002   (CH)   ............ PCT/CH02/00452

(51) Int. Cl.
*H04M 1/66* (2006.01)

(52) U.S. Cl. .............. 455/406; 455/411; 455/435.1; 713/185

(58) Field of Classification Search .............. 709/223, 709/249, 203, 220, 221; 713/185; 726/9; 705/34; 455/406–408, 410, 411, 432.1, 435.1, 455/550.1, 558; 370/338, 345; 379/114
See application file for complete search history.

(56) References Cited

U.S. PATENT DOCUMENTS

| 7,171,460 B2 * | 1/2007 | Kalavade et al. ............ 709/223 |
| 2005/0177733 A1 * | 8/2005 | Stadelmann et al. ........ 713/185 |

FOREIGN PATENT DOCUMENTS

WO        WO 01/76297 A1       10/2001

OTHER PUBLICATIONS

Ostrowski, Frank; Roaming und Handover zwischen UMTS und Funk-LAN; XP-001124094; pp. 24-26; Jun. 2002.

* cited by examiner

*Primary Examiner*—Sam Bhattacharya
(74) *Attorney, Agent, or Firm*—Oliff & Berridge, PLC

(57) ABSTRACT

The invention relates to a method and system for recording and billing of services during roaming of a mobile IP node (20) in heterogeneous WLANs, in which first call detail records are transmitted from an access server (23/1001) to a billing module (1003) and second call detail records from the access server to a proxy module (1002). By means of a clearing module (1004), the obtained service is billed (1016) at a provider (1008) of a fixed network (1007) and/or TAP files (1017) are transmitted to a GSM (1005) service provider (1006) for billing.

14 Claims, 7 Drawing Sheets

METHOD AND SYSTEM FOR GSM BILLING DURING WLAN ROAMING

The invention presented here relates to a method and system for seamless roaming in heterogeneous WLANs in which, for billing and accounting, a mobile IP node requests access to the WLAN through an access server via a wireless interface within the basic service area of a WLAN, whereby the basic service area of the WLAN includes of one or more access points assigned to the access server, and whereby the mobile IP node is authenticated by means of an IMSI stored on the SIM card of the IP-Node. Most especially the invention relates to a method for mobile nodes in heterogeneous WLANs.

In the last years the worldwide number of Internet users, and thereby the amount of information being offered there, has increased exponentially. However, even though the Internet offers worldwide access to information, the user does not normally have access to it until he/she has arrived at a certain network access point such as, for example, at the office, at school, at the university or at home. The growing availability of IP-capable mobile units such as for example PDAs, cellular phones and laptops are beginning to change our idea of the Internet. An analogous transition from fixed nodes in networks to more flexible requirements based on higher mobility has just begun. In mobile telephone use, for example, this tendency has shown itself, among other things, in new standards such as WAP, GPRS or UMTS. To be able to better understand the difference between the present reality and the IP connection possibilities of the future, one can take as a comparison the development of telephony during the last twenty years in the direction of mobility. The demand in the private as well as in the business sector for a worldwide independent wireless access to LANs (e.g. in airports, cities, etc., etc.) using laptops, PDAs etc. is enormous. However the WLANs based, for example, on IP today do not offer the service, such as provided e.g. with GSM/GPRS, which would permit free roaming of the user. These services should also, apart from security mechanisms such as in GSM/GPRS, include facilities for service authentication and for billing, i.e. inclusion of billing for the service provided, etc. On the other hand, such a service is also not being offered by existing GSM/GPRS operators. It is not only the roaming between different WLANs that is important. Through the enormous growth in information technology with WLANs (with Internet access, etc.) and also the great growth in mobile telephone usage, it is useful to combine both these worlds. Only the combination of both these worlds makes possible easy and automatic roaming for wireless LANs, as the user of mobile telephone technology is accustomed to. Thus there exists the demand for service providers enabling standard-spanning roaming between different WLAN service providers and between WLAN service providers and GSM/GPRS service providers.

Computer networks or local area networks (LANs) consist normally of so-called nodes, which are connected via physical mediums such as coaxial cables, twisted pair cables or optical fiber cables. These LANs are also known as wired LANs (wired fixed networks). During the last years also cable-free LANs or so-called wireless LANs have become increasingly popular (e.g. through developments such as the AirPort-System by Apple Computer, Inc., etc.). Wireless LANs are especially suitable for linking mobile units (nodes), such as e.g. laptops, notebooks, PDAs (Personal Digital Assistant) or mobile radio devices, in particular mobile radio telephones, using an appropriate interface, in a local computer network. The mobile nodes are equipped with an adaptor including a transmitter/receiver as well as a controller card (such as e.g. an infrared (IR) adapter or a low frequency radio wave adapter). The advantage of such mobile nodes is that they can be moved freely within the range of the wireless LAN. The mobile nodes either communicate directly with each other (peer-to-peer wireless LAN), or send their signal to a base station which amplifies the signal and/or passes it on. The base stations may also incorporate bridge functions. Via such base stations with bridge functions, the so-called Access Points (APs), the mobile nodes of the wireless LAN can gain access to a wired LAN. Typical network functions of an access point include the transmission of messages from one mobile node to another, the transmission of messages from a wired LAN to a mobile node and the transmission of messages from a mobile node to a wired LAN.

The physical range of an AP is called the Basic Service Area (BSA). If a mobile node is located within the BSA of an AP it can communicate with this AP, providing the AP is also within the signal range (Dynamic Service Area (DSA)) of the mobile node. Normally several APs are assigned to an access server that, among other things, monitors and administers the authorization of the mobile nodes via a user database. The total area that is covered by the APs of an access server is known as the so-called hot spot. Mobile nodes are typically provided with a signal strength from 100 mwatts up to one watt. To be able to connect the wireless LAN to the wired LAN it is important for the AP to determine if a certain message (information frame) within the network is destined for a node that is within the wired LAN or within the wireless LAN, and, if required, to forward this information to the corresponding node. For this purpose APs are provided with so-called bridge functions, e.g. in accordance with IEEE Standard Std 802.1D-1990 "Media Access Control Bridge" (31-74 ff). For these bridge functions a new mobile node in the wireless LAN is typically registered in an FDB (Filtering Database) of the AP within whose range the node lies. With each information frame on the LAN the AP compares the target address with the addresses (MAC Addresses (Media Control Addresses)) which it has stored in its FDB, and transmits, rejects or transfers the frame to the wired LAN or respectively to the wireless LAN.

With mobile network usage, an existing IP access to the mobile node by applications should not be interrupted if the user changes his location within the network. On the contrary, all connections and interface changes, such as e.g. changes to different hot spots and especially different networks (Ethernet, mobile radio phone network, WLAN, Bluetooth, etc.), should be able to be performed automatically and not interactively, so that the user does not even have to be aware of the change taking place. This also applies, for example, during the use of real-time applications. True mobile IP computing exhibits many advantages based on a stable access to the Internet at all times. With such an access, work can be organized freely and independently from the desk. The demands made on mobile nodes in networks distinguish themselves in various ways from the initially mentioned development in mobile radio technology, however. The end points in the mobile radio system are, generally speaking, human beings. In mobile nodes, however, computer applications can perform interactions between other network participants without any human actions or interventions. Extensive examples of this can be found in airplanes, ships and automobiles. Thus especially mobile computing with Internet access can make sense together with other applications such as e.g. in combination with positioning devices, such as the satellite-based GPS (Global Positioning System).

One of the problems with mobile network access via Internet Protocol (IP) is that the IP protocol, which is used to route the data packets in the network from the source address to the target address (Destination Address), uses so-called IP addresses (IP: Internet Protocol). These addresses are assigned to a fixed location in the network, similar to the way telephone numbers of fixed networks are assigned to a physical wall socket. When the destination address of the data packets is a mobile node, this means that with each network location change a new IP network address must be assigned, which renders transparent mobile access impossible. These problems were solved by the mobile IP standard (IETF RFC 2002, October 1996) of the Internet Engineering Task Force (IETF), in that the mobile IP allows the mobile node to use two IP addresses. One of them is the normal static IP address (home address), which specifies the location of the home network, while the second is a dynamic care-of address, which designates the current location of the mobile node within the network. The assignment of the two addresses makes it possible to reroute the IP data packets to the correct current address of the mobile node.

One of the most frequently used protocols for authentication of a user within a wireless LAN is the open source protocol IEEE 802.1x (in the current version 802.11) from the Institute of Electrical and Electronics Engineers Standards Association. The IEEE 802.1x authentication permits authenticated access to IEEE 802 media such as, for example, Ethernet, Token Ring and/or 802.11 wireless LAN. The 802.11 protocol generates for wireless LAN, i.e. for wireless local networks, a 1 or 2 Mbps transmission in the 2.4 GHz band, whereby either FHSS (Frequency Hopping Spread Spectrum) or DSSS (Direct Sequence Spread Spectrum) is used. For authentication, 802.1x supports authentication EAP (Extensible Authentication Protocol) and TLS (Wireless Transport Layer Security). 802.11 also supports RADIUS. Although the RADIUS support is optional in 802.1x, it is to be expected that most of the 802.1x authenticators will support RADIUS. The IEEE 802.1x protocol is a so-called port-based authentication protocol. It can be used in every environment in which a port, i.e. the interface of a unit, can be specified. With the authentication based on 802.1x, three units can be differentiated. The unit of the user (supplicant/client), the authenticator and the authentication server. It is the role of the authenticator to authenticate the supplicant. Authenticator and supplicant are connected, for example, via a point-to-point LAN segment or a 802.11 wireless LAN. Authenticator and supplicant have a defined port, a so-called Port Access Entry (PAE), which defines a physical or virtual 802.1x port.

The authentication server generates the authentication services required by the authenticator. In this way it verifies the entitlement data supplied by the supplicant regarding the claimed identity.

The authentication servers are usually based on RADIUS (Remote Authentication Dial-In User Service) of the IETF (Internet Engineering Task Force). The use of the RADIUS authentication protocol and accounting system is widespread in network units such as, for example, routers, modem servers, switches, etc., and is used by most Internet service providers (ISPs). If a user dials into an ISP he/she has to enter normally a user name and password. The RADIUS server verifies this information, and authorizes the user for access to the ISP system. The reason for the widespread use of RADIUS lies among other things in that network units cannot generally cope with a large number of network users each with different authentication data, since this would exceed, for example, the storage capacity of the individual network units. RADIUS permits the central administration of a multiplicity of network users (addition, deletion of users, etc.). This is therefore a necessary prerequisite of the ISPs (Internet Service Providers) for their service because their number of users often amounts to several thousand to several tens of thousands. RADIUS further generates a certain permanent protection against hackers. The remote authentication by RADIUS based on TACACS+ (Terminal Access Controller Access Control System+) and LDAP (Lightweight Directory Access Protocol) is relatively secure against hackers. Many other remote authentication protocols, in contrast, have only temporary or insufficient or no protection against hacker attacks at all. Another advantage is that RADIUS is at present the de-facto standard for remote authentication, whereby RADIUS is also supported by nearly all systems, which is not the case for other protocols.

The above-mentioned Extensible Authentication Protocol (EAP) is in reality an extension of the PPP (Point-to-Point Protocol) and is defined by the Request for Comments (RFC) 2284 PPP Extensible Authentication Protocol (EAP) of the IETF. By way of PPP a computer can be connected to the server of an ISP, for example. PPP works in the data link layer of the OSI model, and sends the TCP/IP packets of the computer to the server of the ISP that forms the interface to the Internet. In contrast to the older SLIP protocol (Serial Line Internet Protocol), PPP functions more stably and has error correction facilities.

The extensible authentication protocol is a protocol on a very general level that supports diverse authentication methods such as, for example, token cards, Kerberos of the Massachusetts Institute of Technology (MIT), strike off passwords, certificates, public key authentication and smart cards or the so-called Integrated Circuit Cards (ICC). IEEE 802.1x defines the specifications such as EAP that must be integrated into LAN frames. With communication in wireless networks via EAPs, a user requests from an access point via wireless communication, i.e. a connection hub for the remote access client or supplicant to the WLAN, access to the wireless LAN. The AP then requests from the supplicant the identification of the user, and transmits the identification to the above-mentioned authentication server, that is based, for example, on RADIUS. The authentication server allows the Access Point to recheck the identification of the user. The AP collects this authentication data from the supplicant and transmits these to the authentication server which terminates the authentication method.

With EAP an arbitrary authentication method generates a remote access connection. The precise authentication scheme is respectively determined between the supplicant and the authenticator (that means the remote access server, the Internet Authentication Service (IAS) server, or respectively for WLAN the access point). As mentioned above, EAP thereby supports many different authentication schemes such as, for example, generic Token Card, MD5-Challenge, Transport Level Security (TLS) for smart cards, S/Key and possible future authentication technologies. EAP permits an unlimited number of question/answer communications between the supplicant and the authenticator, whereby the authenticator or respectively the authentication server requests specific authentication information and the supplicant, i.e. the remote access client responds. As an example, via the authenticator, the authentication server can request individually from the so-called security token cards a user name, then a PIN (Personal Identity Number) and finally a token card value from the supplicant. A further authentication level is thereby performed for each question/answer cycle. If all authentication levels are successfully answered, the supplicant is authenticated. A specific EAP authentication scheme is termed an EAP type. Both sides, i.e. supplicant and authenticator, must support the same EAP type so that authentication can be carried out. As mentioned, this is determined at the start between supplicant and authenticator. Authentication servers based on RADIUS normally support EAP, which offers the possibility of sending EAP messages to a RADIUS server.

In the state of the art, EAP-based methods for authentication of a user and for allocation of session keys to the user via the GSM Subscriber Identity Module (SIM) are also known. The GSM authentication is based on a question-answer method, the so-called Challenge-Response Method. As a challenge (question) the authentication algorithm of the SIM card is given a 128-bit random number (generally known as a RAND). Then a confidential algorithm, specific to the respective operator, runs on the SIM card, which algorithm receives as an input the random number RAND and a confidential key Ki, stored on the SIM card, out of which it generates a 32 bit response (SRES) and a 64 bit key Kc. Kc is designed for encoding the data transfer via wireless interfaces (GSM Technical Specification GSM 03.20 (ETS 300 534): "Digital cellular telecommunication system (Phase 2); Security related network functions", European Telecommunications Standards Institute, August 1997). Used in the EAP/SIM authentication are several RAND challenges to generate several 64 bit Kc keys. These Kc keys are combined into a longer session key. With EAP/SIM the normal GSM authentication method is extended by means of the RAND challenges additionally having a Message Authentication Code (MAC), to generate mutual authentication. To perform the GSM authentication the authentication server should have an interface with the GSM network. The authentication server operates consequently as a gateway between the Internet Authentication Service (IAS) server network and the GSM authentication infrastructure. At the start of the EAP/SIM authentication, with a first EAP request by the authenticator, the authentication server requests from the supplicant, among other things, the International Mobile Subscriber Identity (IMSI) of the user. With the IMSI the authentication server receives on request from the authentication center (AuC) of the corresponding cellular wireless network operator, normally known in the GSM network as Home Location Register (HLR) or respectively Visitor Location Register (VLR), n GSM triplets. From the triplets the authentication server obtains a Message Identification Code for n* RAND and a lifespan for the key (together MAC_RAND), as well as a session key. With this the authentication server can perform the GSM authentication on the SIM card of the supplicant or respectively of the user. Since RAND are provided to the supplicant together with the Message Authentication Code MAC_Rand, it becomes possible for the supplicant to verify if the RANDs are new and were generated through the GSM network.

Known in the state of the art for the billing of the service obtained by mobile units in GSM networks is the so-called TAP protocol (TAP: Transferred Account Procedure) of the Transferred Account Data Interchange Group (TADIG) of the GSM Association. GSM is based on the concept of roaming, which permits a user of a mobile radio device to use his or her mobile radio device in any desired country and network. The billing of the service obtained is thereby not at all a trivial matter, however. Worldwide today there are more than 400 GSM networks in operation, and in addition there exist an estimated more than 20 000 individual roaming agreements between the network operators. Thus behind the seemingly simple idea of roaming there lies an extremely complex process of data acquisition, data distribution and data evaluation in order to make the billing possible. The Transferred Account Procedure (TAP) is a method by which mobile radio network service providers exchange roaming billing information. Following TAP2 and TAP2+, TAP3 was launched on the $4^{th}$ of June 2000. TAP3 can be termed today as the standard, although TAP is a further developing protocol.

Most of the voice and data traffic in GSM networks comes or ends in a network other than that in which the mobile user is located at the present time. The operator of a local network charges fees for each call which ends at one of his users, regardless of whether a fixed network or a mobile radio network is involved. Therefore the local fixed network operators mutually conclude agreements with the local mobile radio network operators to simplify the charging of the fees. Thus it is also not necessary then for a Swiss mobile radio network operator to conclude an agreement with a Canadian fixed network network <sic.> provider in order to bill for a call of a Swiss mobile radio network user to a Canadian fixed network network <sic.> user. Normally the Swiss fixed network provider already has an agreement concluded with the Canadian fixed network provider relating to billing mode and fees, and the Swiss mobile radio network operator bills via the Swiss fixed network provider with a corresponding agreement. The costs are usually charged to the user either directly (retail billing) or via a service provider (wholesale billing). The mode of billing of roaming data traffic or roaming voice traffic between different mobile radio networks (PMN: Public Mobile Network) takes place by means of the TAP protocol. Roaming call records are typically created either as TAP or is as CIBER (Cellular Intercarrier Billing Exchange Roamer) records. CIBER records are used by mobile radio network operators who work with AMPS-based technologies, such as e.g. AMPS, IS-136 TDMA and IS-95 CDMA. TAP is used above all by GSM mobile radio network service providers, and is the main protocol for billing in GSM-dominated areas.

Details of a call by a user who is located in a foreign network (VPLMN: Visited Public Land-based Mobile Network) is <sic. are> registered in a Mobile Switching Center (MSC) of the network. Each call thus generates one or more call records. The GSM standard for these records is defined in GSM 12.05, although many providers use their own formats. The call records of the MSC are transmitted to a billing system of the VPLMN for billing. These call records are then converted into TAP format, and assigned to the respective user. Within 36 hours at the latest the TAP records are sent to the respective mobile radio network service provider. The TAP files contain in addition information relating to the provider service tariff (IOT: Inter Operator Tariff) and all further bilateral agreements and privilege or discount schemes. The TAP records are sent directly, or more commonly via a billing point, such as e.g. a clearing house. If the home network operator (HPMN: Home Public Mobile Network) receives a TAP record from the VPLMN, this is converted into a corresponding internal format and billed together with the normal call records of the user which he has generated in the home network. With wholesale billing, in which a service provider bills the costs arising to the user, the HPMN passes the records on to the service provider who can re-bill the calls, in particular according to own tariffs, and who generates the statement of accounts with e.g. call details for the user.

TAP3 supports a multiplicity of services. TAP3 is used today for the billing between GSM service providers and GSM service providers, GSM service providers and non-GSM service providers (inter-standard roaming), and GSM service providers and satellite service providers, etc. The three fundamental service categories voice, fax and so-called supplementary services have been supported already since TAP1. The billing of short message services (SMS), on the other hand, is of a less trivial nature owing to the use of Short Message Service Centers (SMS-C) of third parties. The following reasons make difficult the billing of SMS: 1.) while roaming, a roaming user can receive an SMS (MT-SMS), 2.) while roaming, a roaming user can send an SMS (MO-SMS) in that he uses the SMS-C of his home network, and 3.) while roaming, a roaming user can send an SMS (MO-SMS) in that he uses the SMS-C of a foreign network. The billing of SMS services is thus completely supported starting with TAP2+. Starting with TAP3, supported furthermore is the billing of Single Circuit Switched Data, HSCSD (High Speed Circuit Switched Data) and GPRS (General Packet Radio Service). TAP3 likewise supports all value-added services (VAS), such as e.g. the so-called billing for content. The billing of value-added services is often difficult, however, since it has as a prerequisite the consent of the service provider to the billed services. Customized Application Mobile Enhanced Logic (CAMEL) is supported starting with TAP 3.4. CAMEL is especially important for applications with prepaid services for roaming users, and may gain powerfully in significance in the future. Another important application for TAP3 is the supporting of billing based on Inter Operator Tariff (IOT). IOT makes it possible for the home network service provider (HPMN) to check special offers and tariffs of a foreign service provider (VPMN) and to pass them on to the roaming user. Thus, for instance, the VPMN can give privileges or discounts for different call services or call levels, and the HPMN can simply verify these and adapt its tariffs. The possibility of billing roaming services, regardless of where the user is located just now, is a valuable tool for mobile network service providers, and prevents the loss of receipts, proceeds or resources in the case of interim discounts by a VPMN. Starting with TAP3, the TAP protocol likewise includes detailed information about from where a call has been specifically made, or respectively a service was obtained, etc., and to where it has been directed. This information helps to create a profile of the respective user based on his behavior, which provides important information for adapting and optimizing the services to the needs of the user. In particular it can be used to offer special location-based services, such as e.g. sports or concert events. Finally, with the Returned Accounts Procedure (RAP) protocol, TAP3 also permits a differentiated error handling. Thus with RAP of the HPMN, among other things, detailed TAP files can be checked with respect to their validity and conformity with the TAP standard, and discarded, if necessary, without billings for services thereby being lost.

The state of the art does have a wide variety of disadvantages, however. It is indeed possible, for example, with an EAP-SIM to use the authentication method from the GSM networks in the wireless LAN technology for authentication of supplicants or respectively of remote access clients, provided the user has an IMSI with a GSM provider. It is also possible in principle, by means of e.g. mobile IP of the IETF (Internet Engineering Task Force), to reroute (route) data streams to the respective mobile remote access client registered with an access server via an access point. By far not all the problems of mobile network usage allowing a really free roaming of the user are thereby solved, however. One of the problems is that in the IP network the prerequisites, required in the GSM standard, with respect to security, billing and service authorization are no longer there. This is intrinsically connected with the open architecture of the IP protocol. That means that in the IP standard a lot of data are missing which are absolutely necessary for full compatibility with GSM networks. Moreover an access server based for example on RADIUS supplies a single data stream. This cannot simply be mapped to the multi-part data stream of the GSM standard.

Another drawback in the state of the art is that today wireless LANs are based on individual hot spots (i.e. the basic service area of the access points of an access server), which are on offer from various software and hardware developers around the world. This makes difficult the combination of the two worlds since such gateway functions must each be adapted individually to the specific solution. The technical specifications for the GSM authentication interface may be referenced in MAP (Mobile Application Part) GSM 09.02 Phase 1 Version 3.10.0.

It is the object of this invention to propose a new method for mobile nodes in heterogeneous WLANs. In particular, it should be made possible for the user to move between different hot spots without any difficulty (roaming), without having to bother about registering, billing, service authorization, etc., at the various WLAN service providers, i.e. enjoy the same convenience as he is accustomed to from mobile radio technology such as e.g. GSM.

These objects are achieved according to the present invention through the elements of the independent claims. Further preferred embodiments follow moreover from the dependent claims and from the specification.

These objects are achieved through the invention in particular in that for recording and billing of services during roaming of a mobile IP node in heterogeneous WLANs, the mobile IP node accesses an access point of a WLAN within a basic service area of a WLAN via a wireless interface, and the basic service area of the WLAN includes one or more access points assigned to an access server, with which, upon request from the access server, the mobile IP node transmits an IMSI stored on an SIM card of the mobile IP node to the access server, and the IMSI of the IP node is stored in a database of an SIM-RADIUS module, whereby, by means of an SIM user database and an SIM gateway module, an <sic. the> SIM-RADIUS module supplements user-specifically the logical IP data channel of the WLAN towards corresponding GSM data for signal and data channels of a GSM network, whereby, by means of which supplemented signal and data channels, an authentication and/or service authorization of the mobile IP node is carried out at an HLR and/or VLR of a GSM network, based on the IMSI of the SIM card of the mobile node, whereby, by means of a billing gateway interface, a billing module accesses the access server, by means of which billing gateway interface first call detail records of the mobile IP node are transmitted from the access server to the billing module, and which billing gateway interface includes an assigned billing management database with the configuration profile of each access server, second call detail records of the mobile IP node being transmitted to a proxy module, which proxy module captures at least the identity of the mobile IP node and/or duration and/or provider of the obtained service and passes it on to the billing module, and whereby the billing module generates TAP files corresponding to the obtained service, based on the data of the proxy module and the first call detail records, and transmits these together with billing instructions to a clearing module, which billing instructions include at least user-specific and/or service-provider-specific billing data, and which clearing module bills the service obtained by the user to a provider of a fixed network and/or transmits the TAP files for billing to a GSM service provider. In an embodiment variant, a first call detail record can include e.g. only SIM-based authentication information. As an embodiment variant, a second call detail record can be created based at least on the IP address of the mobile IP node and identifications of the service providers whose service was obtained by the mobile node. The billing management database can include e.g. IP addresses and/or GSM identification of the user and/or service provider. The first call detail records of the mobile IP node, which are transmitted from the access server to the billing module, can be created, among other things, SIM-based, while the second call detail records, which are transmitted from the access server to the proxy module, can be created IP-based, such as e.g. on RADIUS data. This has the advantage, among other things, that a seamless roaming between different and heterogeneous WLANs is possible. Through the combination of the WLAN technology, especially the IP networks, with the GSM technology, the roaming of the user becomes possible, without his having to bother about registration, billing, service authorization etc. with the different WLAN service providers. This means that the user enjoys the same convenience as he/she is accustomed to from mobile radio technology such as e.g. GSM. At the same time it is possible in a completely new way to combine the advantages of the open IP world (access to the worldwide Internet etc.) with the advantages of the GSM standard (security, billing, service authorization, etc.). The invention also makes it possible to create a method for roaming in WLANs without a corresponding module having to be installed in each access server. On the contrary, by using RADIUS the infrastructure (WLAN/GSM) can be taken over unchanged.

In an embodiment variant, the data stream of the mobile IP node during access to the WLAN from the access point is directed via a mobile radio network service provider. This has the advantage, among other things, that the mobile radio network provider has complete control over the data stream. In this way he can specifically give service authorizations, perform detailed billing, and incorporate security mechanisms. Among other things, he can thereby combine the open, difficult-to-control IP world, including e.g. the Internet, with the advantages of the GSM world. This plays a big role, e.g. with respect to liability issues of the provider or service vendor, especially recently.

In another embodiment variant, the TAP files are created based at least on Inter Operator Tariffs as well as Public Mobile Network TAP identification codes. In combination therewith or as an independent embodiment variant, it is likewise conceivable, for instance, that the billing management database includes Inter Operator Tariffs as well as Public Mobile Network TAP identification codes. This embodiment variant has the advantage, among other things, that the home network service provider (HPMN) can simply verify the IOT of the foreign network service provider (VPMN) in which the user is located at the present time (roaming). The VPMN can thereby give e.g. discounts for specific connections, and the HPMN can check that these have been correctly applied. Independently of any discount programs or call levels of the VPMN, the HPMN can thereby also simply bill each connection and/or each call according to its own tariffs, etc. The possibility of determining the prices for services regardless of in which foreign network and/or home network the user is located just now can be a valuable aid in the billing of services for an HPMN, with which, for example, the loss of special fee reductions of a VPMN can be avoided. By the same token, certain billing schemes for an HPMN can thereby be achieved in the first place, such as e.g. special prices for connections with the home network and/or homeland of the user or/or <sic. and/or> e.g. calls within communities of states, such as Europe, for instance.

It should be stressed here that, in addition to the method according to the invention, the present invention also relates to a system for carrying out this method.

Embodiment variants of the present invention will be described in the following with reference to examples. The examples of the embodiments are illustrated by the following enclosed figures:

FIG. 1 shows a block diagram schematically illustrating a method and a system according to the invention for authentication of a user during roaming in heterogeneous WLANs, mobile IP nodes 20 being connected, via an interface having contacts, to an SIM card 201, and accessing by means of a wireless connection 48 access points 21/22 of the WLAN. An access server 23 of the WLAN authenticates the mobile IP node 20 based on an IMSI stored on the SIM card 201 at an HLR 37 and/or VLR 37 of a GSM mobile radio network.

FIG. 2 shows a block diagram likewise illustrating schematically a method and system according to the invention for authentication of a user during roaming in heterogeneous WLANs, mobile IP nodes 20 being connected to a SIM card 201, via an interface having contacts, and accessing a WLAN by means of a wireless connection 48. The WLAN is connected via an access server 23 to a GSM mobile radio network, in particular to an HLR 37 and/or VLR 37, to a GGSN (Gateway GPRS Support Node) 50 via a GRX module 51 (GRX: GPRS Roaming exchange), via an Internet service provider 52 and via a clearing system 53 for the billing of the obtained services.

FIG. 3 shows a block diagram illustrating schematically a method and system according to the invention for seamless roaming in heterogeneous WLANs, the open IP world being connected to the more restrictive GSM world, by means of the method and system according to the invention, via interfaces for the authentication 371, SS7 372, service authorization 531 and billing 532.

FIG. 4 shows a block diagram illustrating schematically the set-up of an IEEE 802.1x port-based authentication method, the supplicant or remote access client 20 being authenticated via an authenticator or remote access server 21 at an authentication server 23, the WLAN being based on IEEE 802.11.

FIG. 6 shows the role of the TAP protocol during GSM billing and accounting between different network service providers 61/62/63/64.

Figure 8:
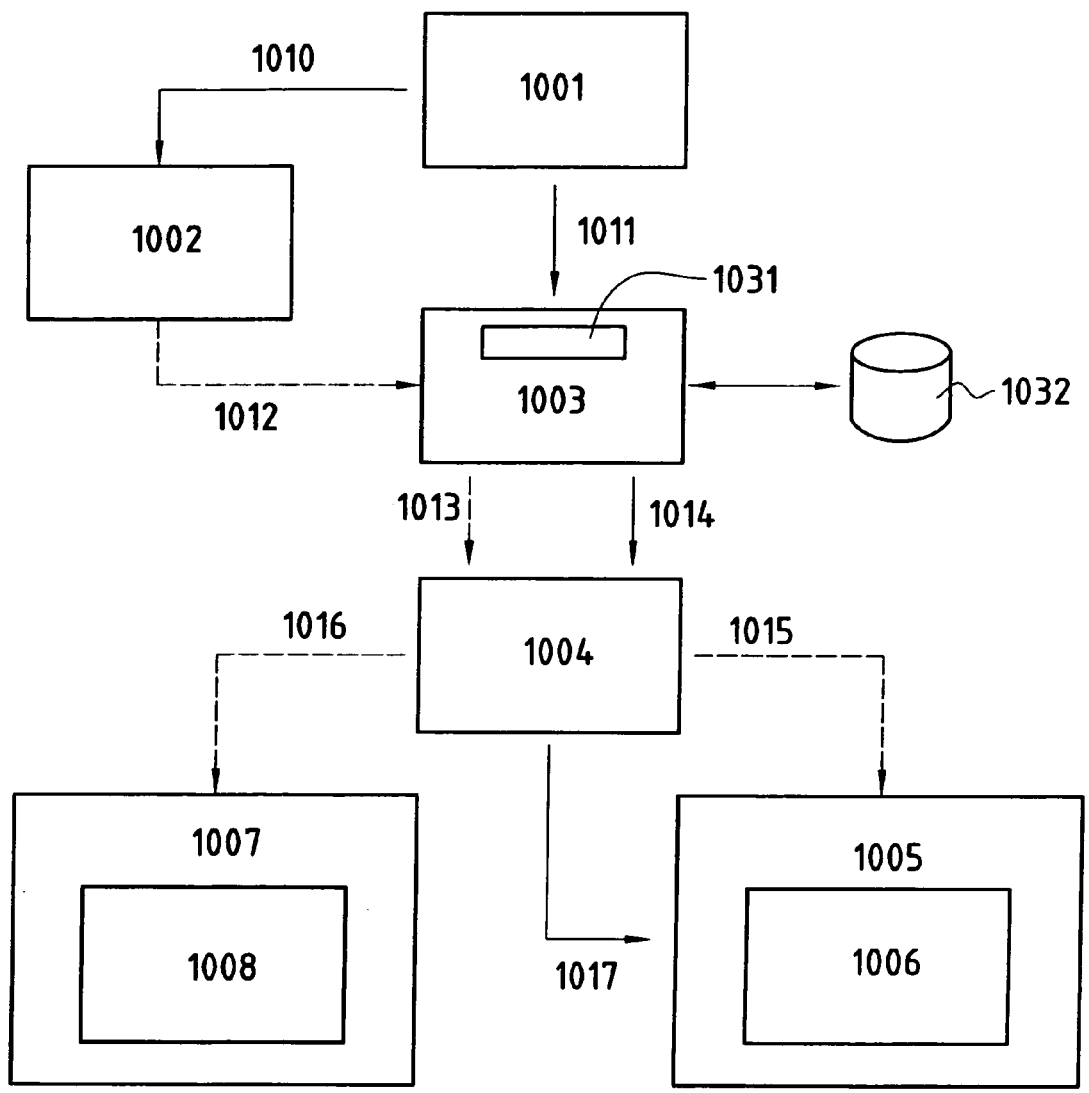

FIG. 8 shows a block diagram illustrating schematically a method and a system according to the invention for recording or accounting and billing of services during roaming of a mobile IP node 20 in heterogeneous WLANs. First call detail records are thereby transmitted from an access server 23/1001 to a billing module 1003 and second call detail records from the access server to a proxy module 1002. By means of a clearing module 1004 the obtained service is billed 1016 at a provider 1008 of a fixed network 1007, and/or the TAP files 1017 are transmitted for billing to a GSM 1005 service provider 1006.

Figure 1:
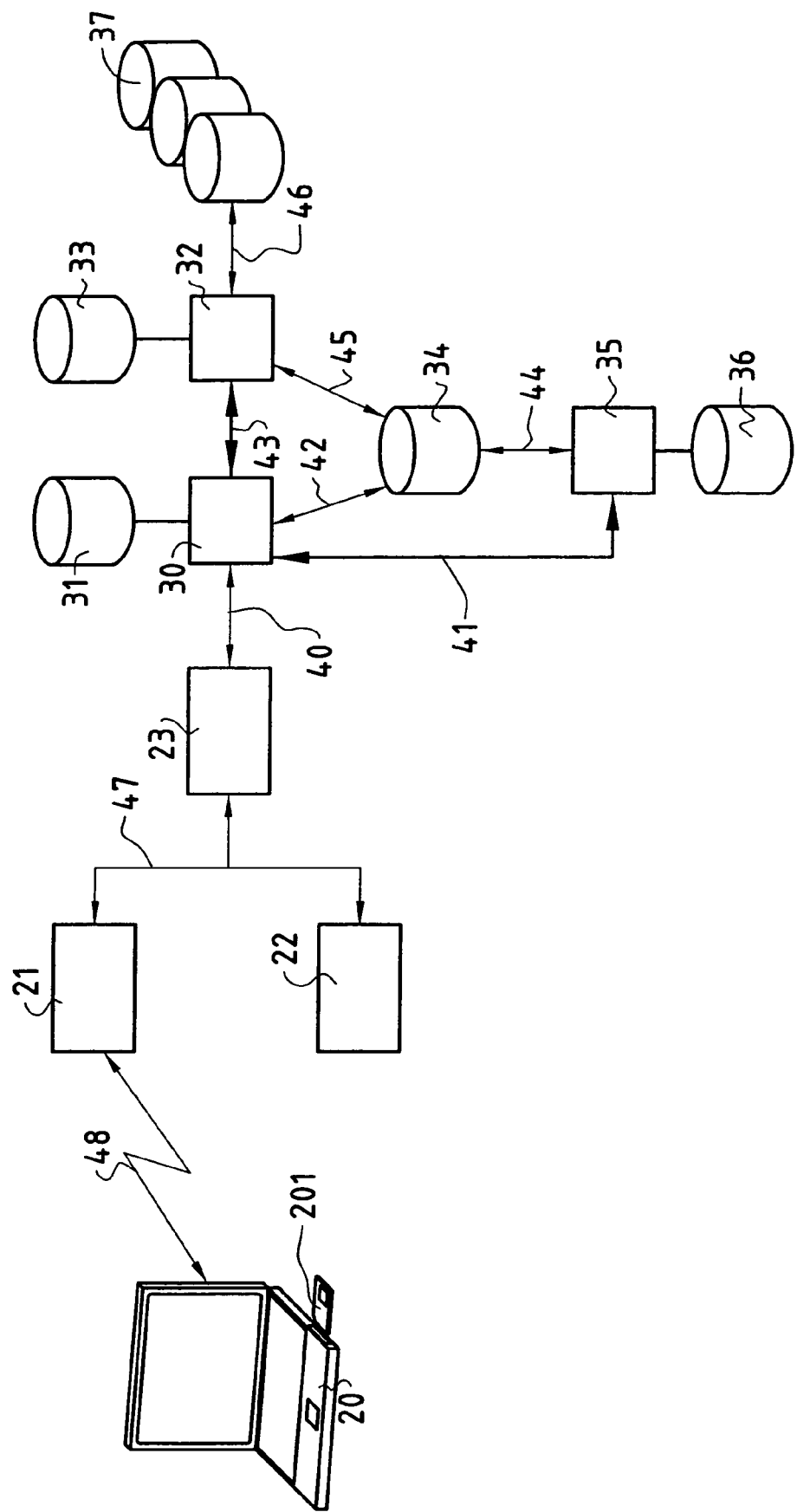

FIG. 1 illustrates an architecture that can be used to achieve the authentication of the invention. FIG. 1 shows a block diagram illustrating schematically a method and system for authentication of a user during roaming in heterogeneous WLANs. The reference numeral 20 in FIG. 1 pertains to a mobile IP node which has the necessary infrastructure including hardware and software components at its disposal to achieve a described method and/or system according to the invention. To be understood by mobile nodes 20 are, among other things, all possible so-called Customer Premise Equipment (CPE) that are provided for use at various network locations and/or in various networks. These include, for example, all IP-capable devices such as e.g. PDAs, mobile radio telephones and laptops. The mobile CPEs or nodes 20 have one or more different physical network interfaces that are also able to support a plurality of different network standards. The physical network interfaces of the mobile nodes can include, for instance, interfaces to WLAN (Wireless Local Area Network), Bluetooth, GSM (Global System for Mobile Communication), GPRS (Generalized Packet Radio Service), USSD (Unstructured Supplementary Services Data), UMTS (Universal Mobile Telecommunications System) and/or Ethernet or another Wired LAN (Local Area Network) etc. The reference number 48 accordingly stands for the different heterogeneous networks such as, for example, a Bluetooth Network, e.g. for installations in roofed-over areas, a mobile radio network with GSM and/or UMTS, etc., a wireless LAN, e.g. based on IEEE wireless 802.1x, but also a wired LAN, i.e. a local fixed network in particular also the PSTN (Public Switched Telephone Network), etc. In principle it is to be said that the method and/or system according to the invention is not tied to a specific network standard, provided that the features according to the invention are present, but can be achieved with any LAN. The interfaces 202 of the mobile IP node can not only be packet-switched interfaces as are used directly by network protocols such as e.g. Ethernet or Token Ring, but can also be circuit-switched interfaces that can be used with protocols such as PPP (Point to Point Protocol), SLIP (Serial Line Internet Protocol) or GPRS (Generalized Packet Radio Service), i.e. those interfaces for example that do not have a network address such as a MAC or a DLC address. As mentioned in part before, the communication can, for example, take place over the LAN, for example by means of special short messages, e.g. SMS (Short Message Services), EMS (Enhanced Message Services), over a signaling channel such as e.g. USSD (Unstructured Supplementary Services Data) or other technologies, like MExE (Mobile Execution Environment), GPRS (Generalized Packet Radio Service), WAP (Wireless Application Protocol) or UMTS (Universal Mobile Telecommunications System), or over IEEE wireless 802.1x or via another user information channel. The mobile IP node 20 can include a mobile IP module and/or an IPsec module. The main task of the mobile IP consists of authenticating the IP node 20 in the IP network and of correspondingly rerouting the IP packets that have the mobile node 20 as the destination address. For further mobile IP specifications, also see for example IETF (Internet Engineering Task Force) RFC 2002, IEEE Comm. Vol. 35 No. 5 1997, etc. Mobile IP especially supports IPv6 and IPv4. The mobile IP capabilities can preferably be combined with the security mechanisms of an IPsec (IP security protocol) module to guarantee secure mobile data management in the public Internet. IPsec (IP security protocol) generates authentication/confidentiality mechanisms packet-wise or socket-wise between network hubs that both utilize IPsec. One of the flexibilities of IPsec lies especially in that it can be configured packet-wise as well as for individual sockets. IPsec supports IPvx, especially IPv6 and IPv4. For detailed IPsec-Specifications refer, for example, to Pete Loshin: IP Security Architecture; Morgan Kaufmann Publishers; November 1999 or A Technical Guide to Ipsec; James S et al.; CRC Press, LLC; December 2000, etc. Although IPsec is used in this embodiment example as an example in describing the use of security protocols on the IP level, all other possible security protocols or security mechanisms or even the omission of security protocols are conceivable according to the invention.

Furthermore, via an interface having contacts, the mobile IP node 20 is connected to a SIM card 201 (SIM: Subscriber Identity Module), on which the IMSI (International Mobile Subscriber Identifier) of a user of GSM networks is stored. For authentication the mobile IP node 20 requests via a wireless interface 202 within the basic service area of a WLAN at an access point 21/22 access to the WLAN. As already described, the different WLANs of different hot spots can embrace heterogeneous network standards and protocols such as, for example, WLAN based on the IEEE wireless 802.1x, Bluetooth etc. The basic service area of the WLAN encompasses one or more access points 21/22 assigned to an access server 23. The mobile IP node 20 transmits to the access server 23, upon request of the access server 23, an IMSI stored on the SIM card 201 of the mobile IP node 20. The IMSI of the mobile IP node 20 is stored using a SIM-RADIUS module 30. Based on the IMSI, the logic IP data channel of the WLAN is supplemented user-specifically towards corresponding GSM data for signal and data channels of a GSM network using information stored in an SIM user database 34. The GSM system encompasses data channels, the so-called traffic channels, and control signal channels, the so-called signaling channels. The traffic channels (e.g. TCH/FS, TCH/HS, TCH/F9,6/4.8/2.4 and TCH/H4.8/2.4 etc.) are reserved for user data, while the signaling channels (e.g. CCCH: Common Control Channels, RACH: Random Access Channels, DCCH: Dedicated Control Channels, CBCH: Cell Broadcast Channel etc.) are used for network management, control functions etc. The logical channels cannot be used over the interface simultaneously, but only in certain combinations according to the GSM specifications. By means of a SIM gateway module 32, to perform the authentication of the IP node based on the GSM data, the required SS7/MAP functions (SS7: Signaling System 7 of the International Telecommunications Union (ITU)/MAP: Mobile Application Part of the GSM standard) are generated, the SIM-RADIUS module 30 carrying out the authentication of the mobile IP node at an HLR 37 (Home Location Register) and/or VLR 37 (Visitor Location Register) of a GSM network, by means of SIM user database 34 and SIM gateway module 32, based on the IMSI of the SIM card 201 of the mobile node 20. The SS7 telecommunications protocol of the ITU is characterized by so-called high-speed circuit switching with out-of-band signaling, whereby Service Switching Points (SSPs), Signal Transfer Points (STPs), and Service Control Points (SCPs) (also frequently designated together as SS7 nodes) are used. Out-of-band signaling is a signal transmission for which not the same data channels are used as for data transmission or voice transmission. For this purpose a separate digital channel (signal channel) is generated, via which signals can be transmitted between two network components typically at 56 or 64 kilobits per second. The SS7 architecture is conceived such that each network component (node) can exchange signals with any other SS7-capable node, and not merely switches which are directly connected to one another.

Figure 4:
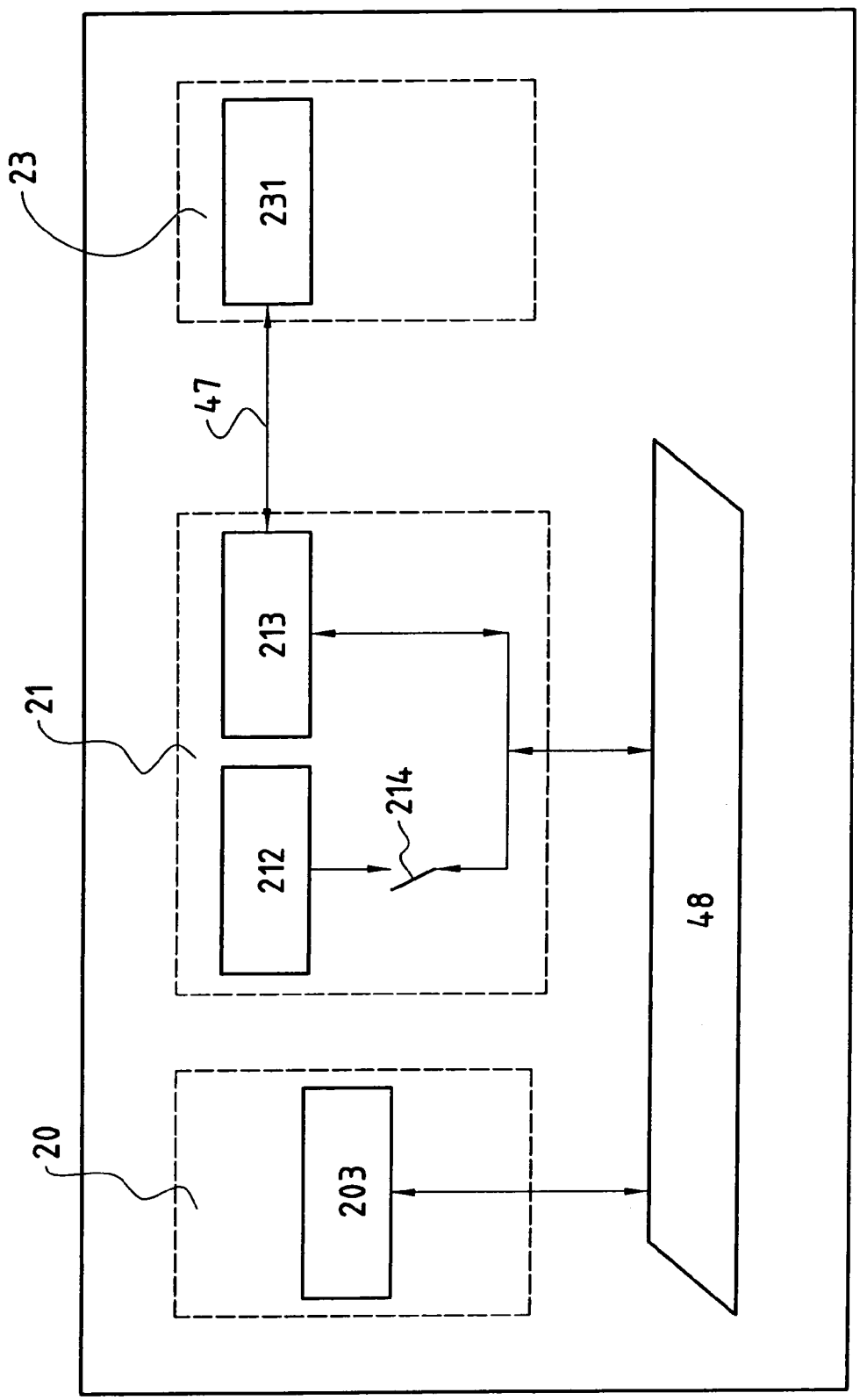
Figure 5:
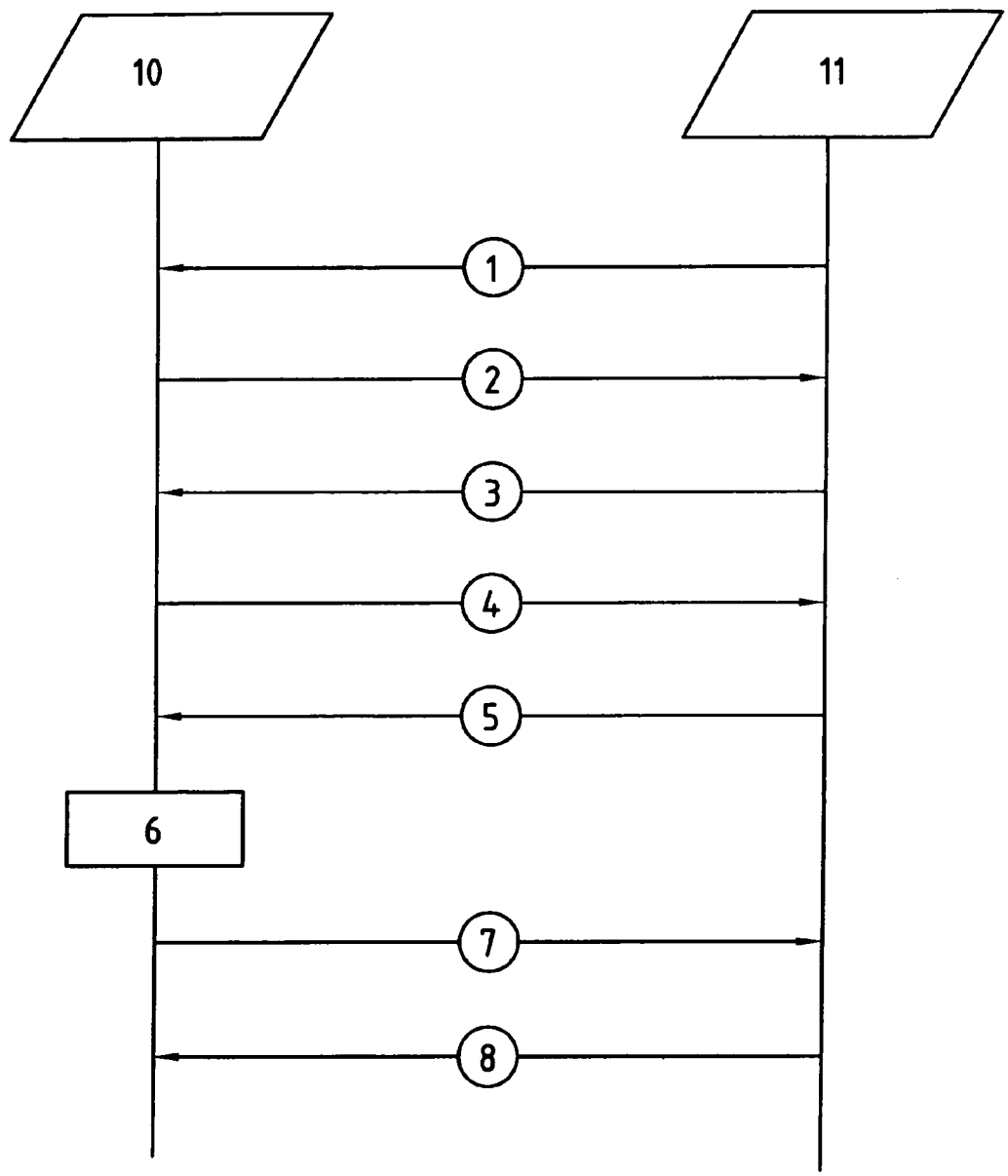
FIG. 5 shows a block diagram illustrating schematically a possible embodiment variant for SIM authentication by means of Extensible Authentication Protocol (EAP), a GSM-based challenge-response method being used.

As illustrated in FIG. 5, the authentication of the mobile IP node 20 can be performed by means of the Extensible Authentication Protocol (EAP). The following challenge-response method can be adopted, for example, for the EAP-based method for authentication of a user and for allocation of session keys to the user by means of the GSM Subscriber Identity Module (SIM). The authentication algorithm of the SIM card is given, as a challenge (question), a 128 bit random number (RAND). A confidential algorithm, specific to the respective operator, then runs on the SIM card that receives as input the random number RAND and a secret key Ki, stored on the SIM card, and generates therefrom a 32-bit response (SRES) and a 64-bit key Kc. Kc serves to encode the data transfer via wireless interfaces (GSM Technical Specification GSM 03.20 (ETS 300 534): "Digital cellular telecommunication system (Phase 2); Security related network functions," European Telecommunications Standards Institute, August 1997). For authentication several RAND challenges are used to generate several 64 bit Kc keys. These Kc keys are combined to a longer Session Key. FIG. 4 shows schematically the set-up between the mobile IP node 20, the access point 21 and the access server 23 in an IEEE 802.1x port-based authentication method, the mobile IP node 20 (remote access client/supplicant) being authenticated via the access point 21 (authenticator) at the access server 23 (authentication server). The WLAN in this embodiment example is based on IEEE 802.11. In order to perform the GSM authentication, the SIM gateway module 32 functions as a gateway between Internet Authentication Service (IAS) server network and the GSM authentication infrastructure, i.e. the access point 21/22 or respectively the access server 23 and the HLR 37 or respectively the VLR 37. At the start of the EAP/SIM authentication, the access server 23 requests with a first EAP request 1 through the access point 21/22 from the mobile IP node 20, among other things, the International Mobile Subscriber Identity (IMSI) of the user. This is transmitted by the mobile IP node via EAP response 2 to the access Point 21/22. Upon a triplet request from the respective HLR 37, or respectively named VLR 37, the access server 23 receives, with the IMSI, n GSM triplets. Based on the triplets, the access server 23 is able to receive a message authentication code for n* RAND and a lifespan for the key (together MAC_RAND) as well as a session key. In a $3^{rd}$ EAP step 3 (FIG. 5) the access server 23 then sends, for example, an EAP request of type 18 (SIM) to the mobile IP node 20, and receives the corresponding EAP response 4. EAP data packets of SIM type additionally have a special subtype field. The first EAP request/SIM is of subtype 1 (start). This packet contains a list of the EAP/SIM protocol version numbers which are supported by the access server 23. The EAP response/SIM (start) 4 (FIG. 5) of the mobile IP node 20 receives the version number selected by the mobile IP node 20. The mobile IP node 20 must select a version number specified in the EAP request. The EAP response/SIM (start) of the mobile IP node 20 also contains a lifespan suggestion for the key and a random number NONCE_MT, which has been generated by the mobile IP node. All the subsequent EAP requests all contain the same version as the EAP response/SIM (start) data packet of the mobile IP node 20. As mentioned, to perform the GSM authentication, this embodiment variant possesses a SIM gateway module 32, that serves as a gateway between the access server 23 and the HLR 37 or respectively the VLR 37. After receipt of the EAP response/SIM, the access server 23 receives an n GSM triplet from the HLR/VLR 37 of the GSM network. From the triplets the access server 23 calculates MAC_RAND and the session key K. The calculation of the cryptographic values of the SIM-generated session key K and of the message authentication codes MAC-Rand and MAC_SRES can be learned, for instance, from the document "HMAC: Keyed-Hashing for Message Authentication" by H. Krawczyk, M. Bellar and R. Canetti (RFC2104, February 1997). The next EAP request 5 (FIG. 5) of the access server 23 is of type SIM and subtype challenge. The request 5 contains the RAND challenges, the lifespan of the key determined by the access server 23, a message authentication code for the challenges and the lifespan (MAC_RAND). After receipt of the EAP request/SIM (challenge) 5, the GSM authentication algorithm 6 runs on the SIM card, and calculates a copy of MAC_RAND. The mobile IP node 20 checks that the calculated value of MAC_RAND is equal to the received value of MAC_RAND. If there is not a correspondence between the two values, the mobile IP node 20 aborts the authentication method and does not forward any of the authentication values calculated by the SIM card to the network. Since the RAND value is received together with the message authentication code MAC_RAND, the mobile IP node 20 can ensure that the RAND is new and was generated by the GSM network. If all checks have been correct, the mobile IP node 20 sends an EAP response/SIM (challenge) 7, which contains as an answer the MAC_SRES of the mobile IP nodes 20. The access server 23 checks that the MAC_RES is correct, and finally sends an EAP success data packet 8 (FIG. 5), which shows the mobile IP node 20 that the authentication was successful. The access server 23 can additionally send the received session key with the authentication report (EAP success) to the access point 21/22. With a successful authentication, a location update is carried out at the HLR 37 and/or VLR 37, and the mobile IP node 20 receives a corresponding entry in a customer database of the access server, the WLAN being released for use by the mobile IP node 20. As was mentioned, this has the advantage, among other things, that a seamless roaming between different and heterogeneous WLANs becomes possible. Through the combination of WLAN technology, especially of the IP networks, with GSM technology, roaming of the user becomes possible without his/her having bother about registration, billing, service authorization, etc., at the respective WLAN service providers, i.e. the user enjoys the same convenience as he/she is accustomed to from mobile radio technology such as, for example, GSM. At the same time it is possible in a completely new way to combine the advantages of the open IP world (access to the worldwide Internet etc.) with the advantages of the GSM standard (security, billing, service authorization, etc.). The invention also makes it possible to create a method for roaming in WLANs without a corresponding module having to be installed in each access server. On the contrary, by using RADIUS, the infrastructure (WLAN/GSM) can be taken over unchanged.

Figure 2:
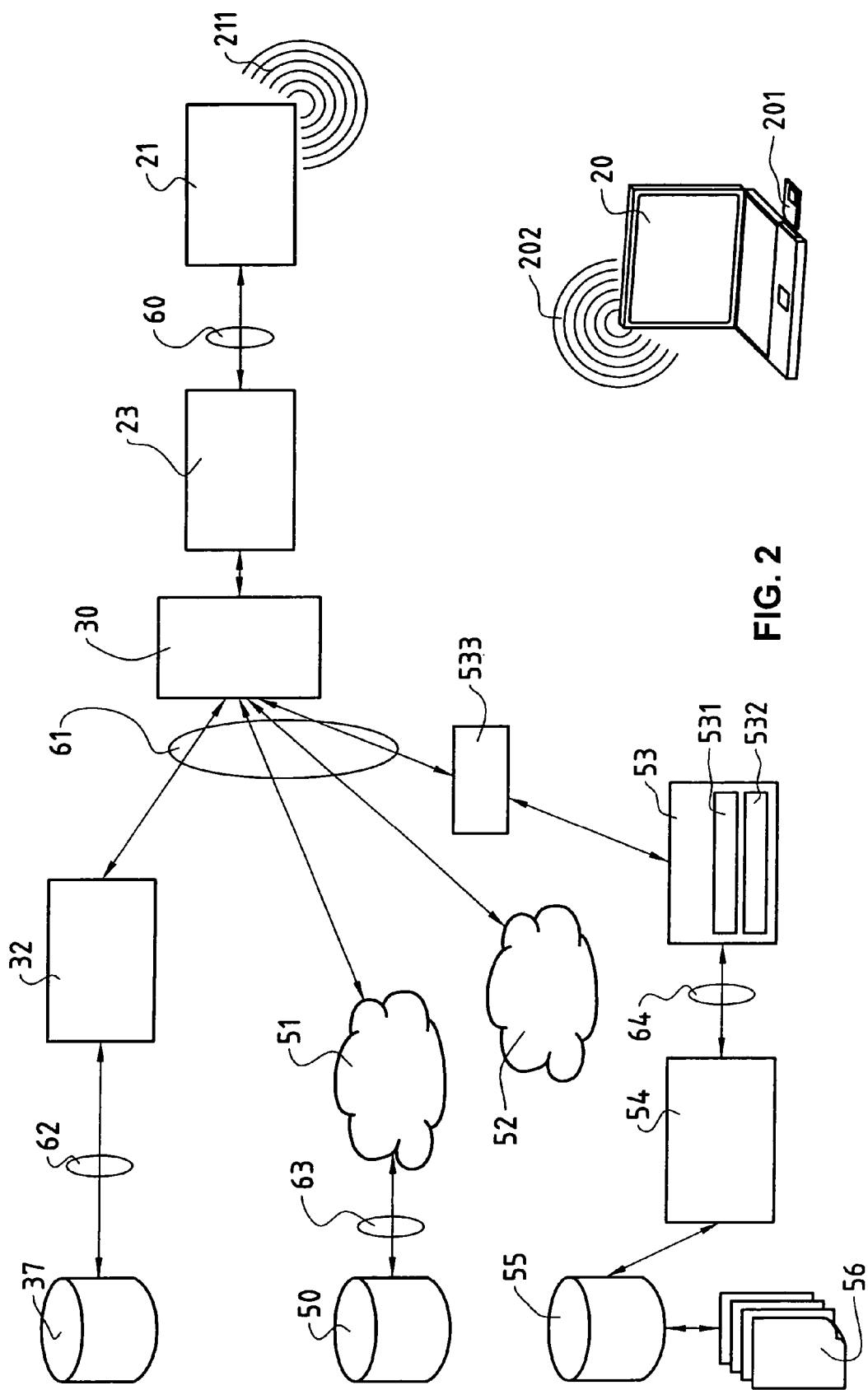
Figure 3:
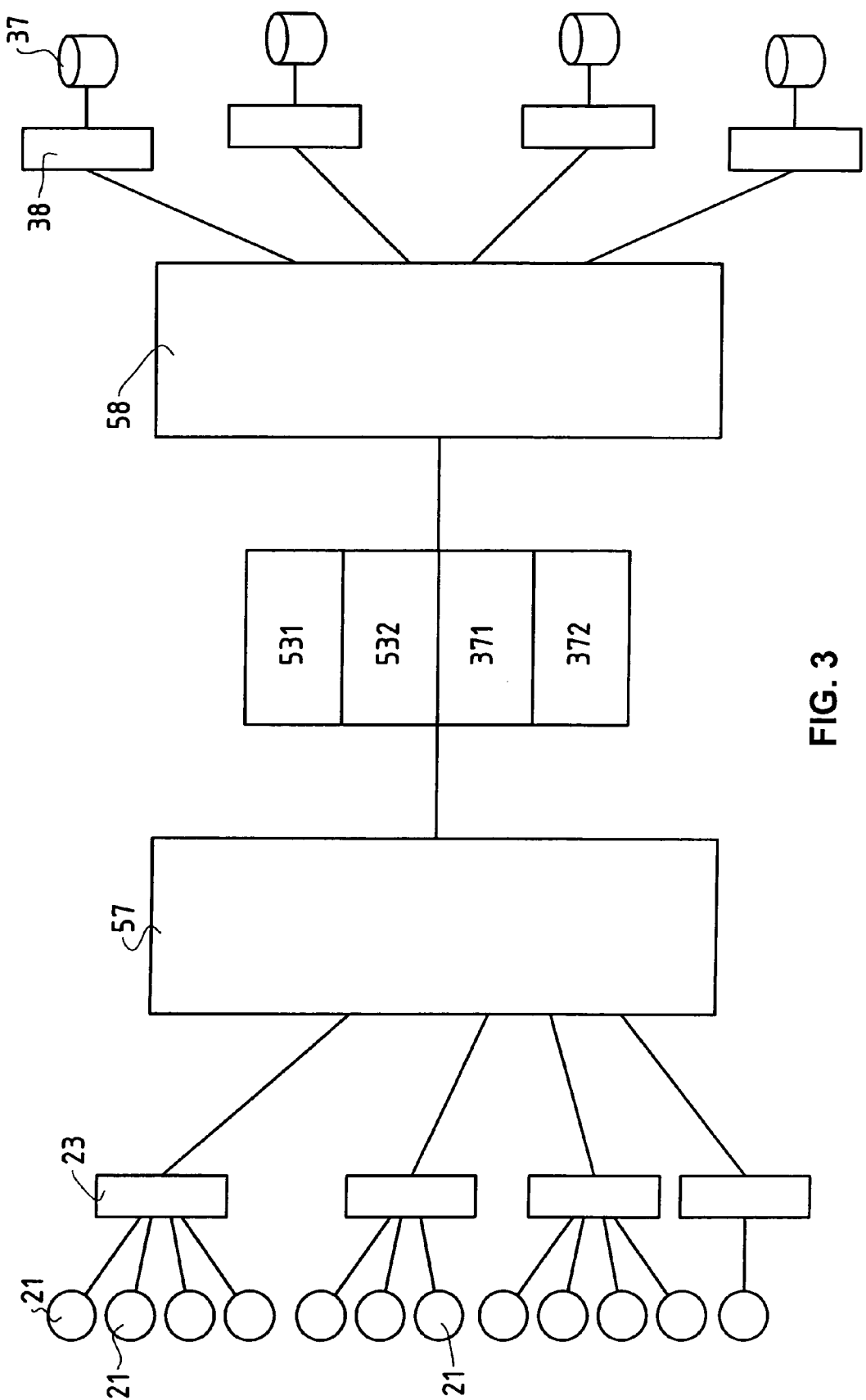

FIG. 2 and FIG. 3 show schematically in a block diagram a method and system according to the invention, how the open IP world 57 are <sic. is> connected to the more restrictive GSM world 58 via the interfaces for the authentication 371, SS7 372, service authorization 531 and billing 532. The reference number 38 thereby indicates different mobile radio network service providers with assigned HLR/VLR 37. As an embodiment variant, it is conceivable for the data stream of the mobile IP node 20 during access to the WLAN from the access point 21/22 to be directed via the mobile radio network service provider 38. This allows the mobile radio network service provider 38 to grant, based on the authentication by means of the IMSI, user-specific service authorization for user of different services and/or to carry out user-specific billing of the service obtained. The service authorization could be carried out, however, e.g. directly at the access point 21/22 by means of a module 214. Furthermore, in the case of FIG. 2, mobile IP nodes 20 are connected to an SIM card 201 via an interface having contacts, and access a WLAN by means of a wireless connection 48. The WLAN is connected via an access server 23 to a GSM mobile radio network, in particular to an HLR 37 and/or VLR 37, to a GGSN (Gateway GPRS Support Node) 50 via a GRX module 51 (GRX: GPRS Roaming eXchange), an Internet service provider 52 and to a clearing system 53 for the billing of the services obtained.

It is to be mentioned that, in an embodiment example extended from the above-mentioned embodiment example, during the authentication, the SIM user database 34 is connected to a sync module 35 and a sync database 36 for changing or deleting existing user datasets or inserting new user datasets, the comparison of the databases 34/36 being performed periodically and/or initiated through changes in the sync database 36 and/or through failure of the SIM user database 34. The sync module 35 and the sync database 36 can be achieved, like the other components according to the invention, through hardware or through software as discrete network components, e.g. as discrete IP node and/or GSM components, or assigned to another system component and/or integrated into another system component. With this embodiment variant, the mobile radio network service providers 38 can proceed in changing or deleting existing user datasets or in inserting new user datasets in the same way as before with their user databases, i.e. without having to purchase or maintain additional systems.

Figure 6:
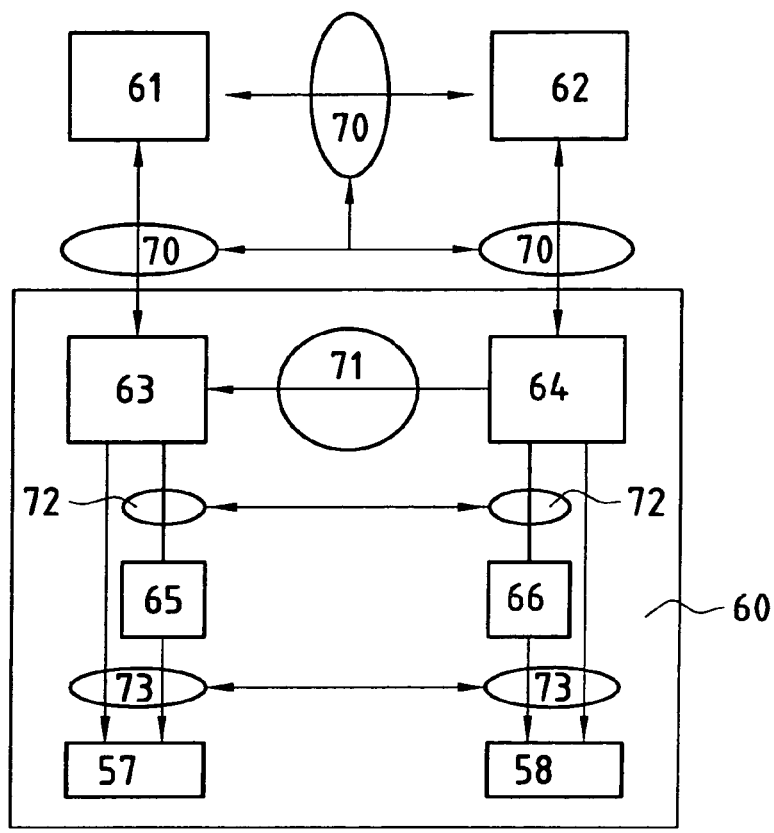
FIG. 6 shows a block diagram illustrating schematically the structure for a recording and billing of services (billing and accounting) in the mixed environment of GSM networks 63/64 and/or fixed networks (PSTN) 61/62 according to the state of the art. In particular
Figure 7:
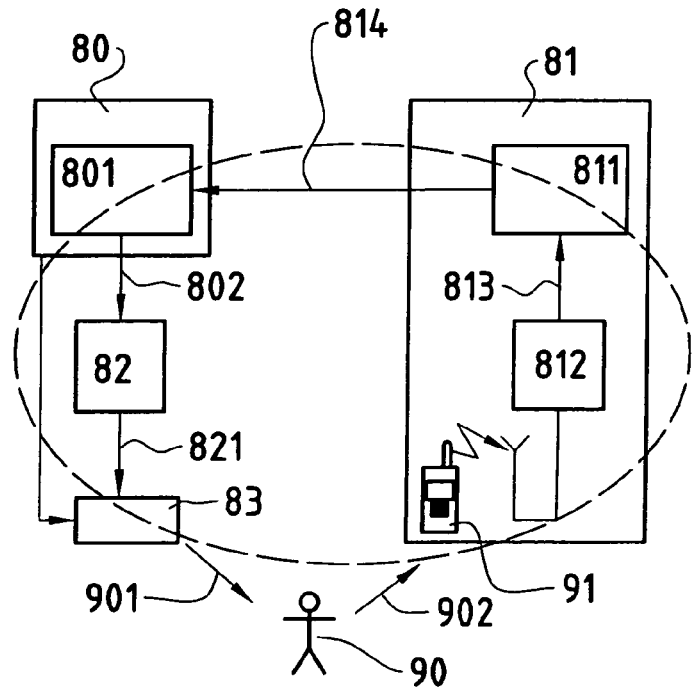
FIG. 7 shows a block diagram illustrating schematically the structure for a recording and billing of services (billing and accounting) between GSM home network service providers 80 and GSM foreign network service providers 81 according to the state of the art using the TAP protocol.

FIG. 6 shows a block diagram illustrating schematically the structure for a recording and billing of services (billing and accounting) in the mixed environment of GSM networks 63/64 and/or fixed networks (PSTN) 61/62 according to the state of the art. On the other hand, FIG. 7 shows schematically in a block diagram the structure for a recording and billing of services (billing and accounting) between GSM home network service providers 80 and GSM foreign network service providers 81 according to the state of the art, likewise using the TAP protocol. Known in the state of the art for the billing and accounting of the service obtained by mobile units in GSM networks is the so-called TAP protocol (TAP: Transferred Account Procedure) of the Transferred Account Data Interchange Group (TADIG) of the GSM Association. In FIG. 6, the reference numerals 61 and 62 represent fixed network service providers (PSTN/ISDN). The reference numeral 70 is the normal billing and accounting of fixed network calls among fixed network service providers of the state of the art. The reference numeral 71 is the billing and accounting between different GSM mobile radio network service providers 63/64 by means of TAP protocol. The reference numeral 72 is the mentioned wholesale billing, while the reference numeral 73 represents correspondingly retail billing. The reference numerals 65/66 stand for GSM service providers. The users 57/58 are thus billed either by means of wholesale billing 72 via a service provider 65/66 or directly by means of retail billing 72 by the GSM mobile radio network service providers 63/64. FIG. 7 shows a possible exchange of data between two network operators 80/81 based on TAP. Details 813 of a call by a user 90, who is located in a foreign network (VPLMN: Visited Public Land-based Mobile Network) 81/902, is <sic. are> registered in a Mobile Switching Center (MSC) 812 of the network 81. Each call thus generates one or more call records 813.

The GSM standard for these records is defined in GSM 12.05, although many providers use their own formats. The call records 813 of the MSC 812 are transmitted to a billing system 811 of the VPLMN 81 for billing. These call records 813 are then converted into TAP format 814, and assigned to the respective user 90. At the latest within 36 hours the TAP records 814 are sent to the respective mobile radio network service provider 801 of the home network 80. The TAP files 814 contain additionally information relating to the provider service tariff (IOT: Inter Operator Tariff) and all further bilateral agreements and privilege or discount schemes. The TAP records are sent directly or more commonly via a billing point such as e.g. a clearing house. If the home network operator (HPMN: Home Public Mobile Network) 801 receives a TAP record 814 from the VPLMN 811, this is converted into a corresponding internal formal 802, and is billed together with the normal call records of the user 90 which he generates in the home network 80. In the case of wholesale billing, in which a service provider 82 bills 901 the costs arising to the user 90, the HPMN 801 passes on the records 802 to the service provider 82, who can then re-bill the calls, in particular according to own tariffs, and who generates 821 the statement of accounts 83 with e.g. call details for the user 90. With this method the user 90 is consequently always billed 901 via the HPMN 801.

FIG. 8 shows a method and system according to the invention for recording and billing of services during roaming of a mobile IP node 20 in heterogeneous WLANs <whereby> the mobile IP node 20 accesses an access point 21/22 of a WLAN within a basic service area of a WLAN via a wireless interface. The basic service area of the WLAN includes one or more access points 21/22 assigned to an access server 23/1001. Via the respective access point 21/22, the mobile IP node 20 transmits to the access server 23/1001, upon request of the access server 23/1001, an IMSI stored on an SIM card 201 of the mobile IP node 20. The IMSI of the IP node 20 is stored in a database 31 of an SIM-RADIUS module 30. By means of an SIM user database 34 and an SIM gateway module 32, an SIM-RADIUS module 30 supplements user-specifically the logical IP data channel of the WLAN towards corresponding GSM data for signal and data channels of a GSM network. Over the supplemented signal and data channels, an authentication and/or service authorization of the mobile IP node 20 is carried out at an HLR 37 and/or VLR 37 of a GSM network, based on the IMSI of the SIM card 201 of the mobile node 20, as described in FIGS. 1, 2 and 3. For the billing and accounting, a billing module 1003 accesses the access server 23/1001 by means of a billing-gateway interface 1031. Via the billing gateway interface 1031, first call detail records of the mobile IP node 20 are transmitted 1011 from the access server 23/1001 to the billing module 1003. The billing module 1003 possesses an assigned software and/or hardware-achieved module, by means of which it can obtain from the access server 23/1001 CDR files via the billing gateway interface 1031, and transmit them to the billing module 1003 and/or to the proxy module 1002. The download can take place periodically, such as e.g. daily, and/or upon request of an access server 23/1001 and/or of the billing module 1003 and/or of the proxy module 1002. Such a first call detail record can be designated in the billing module 1003 e.g. with a correspondingly defined file application identifier. A first call detail record can contain e.g. SIM-based authentication information. The SIM-based authentication information can be, among other things, a hotspot ID, a file number for the sequence of the files obtained as well as include a so-called transfer cut-off time stamp (such as defined e.g. in GSM PRD TD.57). To enable simple access to the access server, the CDRs can be stored on an access server e.g. in three different directories. For instance, a directory with open files, i.e. files which will still be changed, a directory with files which are in fact closed (i.e. are no longer changed), but are marked as not to be sent, and finally a directory with files which are closed and are ready to be sent. The billing gateway interface 1031 includes an assigned billing management database 1032 with the configuration profile of each access server 23/1001. This means that the billing module 23/1001 can obtain from the billing management database 1032 the communication profile for a desired access server 23/1001 of a hot spot. The billing management database 1032 contains all essential profiles and operational configurations which are required for data exchange and operation with the GSM service providers 1006, WLAN service providers and hotspots. The billing management database 1032 can include in particular e.g. IP addresses and/or GSM identification of the users and/or service providers. Based on, among other things, information from the billing management database 1032, the CDR (IP addresses, etc.), TAP files (PMN codes (Public Mobile Network TAP identifier code), IOTs), billing instructions for the WLAN service providers (amounts, etc.) and hotspot authorization for GSM service providers (signaling, etc.) are created, among other things. Conceivable as an embodiment variant is, in particular, an automated update method for the billing management database by means of a signaling gateway module. Such an update method would enable a consistent and current authentication and authorization of the billing module 1003 with the various access servers 1001. Furthermore second call detail records of the mobile IP node 20 are transmitted 1010 to a proxy module 1002, the proxy module 1002 capturing at least the identity of the mobile IP node 20 and/or duration and/or provider of the service obtained, and passing it on 1012 to the billing module 1003. The download can take place by means of the mentioned module achieved through software and/or hardware, which module can obtain CDR files from the access server 23/1001 via the billing gateway interface 1031 and transmit them to the billing module 1003 and/or the proxy module 1002. The download can take place periodically, such as e.g. daily, and/or upon request of an access server 23/1001 and/or of the proxy module 1002 and/or of the billing module 1003. The second call detail records can be created e.g. based at least on the IP address of the mobile IP node and identifications of the service providers, whose service was obtained by the mobile node. This means that the first call detail records of the mobile IP node, which are transmitted from the access server to the billing module, are created SIM-based, among other things, while the second call detail records, which are transmitted from the access server to the proxy module, are IP-based, such as e.g. on RADIUS information. Data from the second CDR are required, among other things, for the billing and clearing of the services of the users and of the WLAN service providers. The billing module 1003 generates TAP files 1014 corresponding to the service obtained, and transmits these together with billing instructions 1013 to a clearing module 1004. This means that the incoming IMSI-authenticated CDRs are each converted into TAP format. The TAP files can also be created e.g. based on Inter Operator Tariffs as well as Public Mobile Network TAP identification codes. In combination therewith, or as an independent embodiment variant, it is likewise conceivable, for example, for the billing management database to include Inter Operator Tariffs as well as Public Mobile Network TAP identification codes. The billing instructions 1013 include at least user-specific and/or service-provider-specific billing data. The clearing module 1004 can bill 1016 the service obtained by the user 1008 to a provider 1008 of a fixed network 1007 and/or transmit the TAP files 1017 to a GSM 1005 service provider 1006 for billing. It is to be mentioned that all modules and/or network components according to the invention can be achieved through hardware as well as also through software. Also during access of the WLAN from the access point 21/22 the data stream of the mobile IP node 20 can be directed via a mobile radio network service provider. The mobile radio network service provider can thereby obtain complete control over the data flow of the user. In this way he can also for the IP world specifically give service authorizations, carry out detailed billing and incorporate security mechanisms. Among other things he can thereby combine the open, difficult-to-control IP world, including the Internet, for example, with the advantages of the GSM world. This plays a big role, e.g. with respect to liability issues of the provider or service vendor, especially recently.

The invention claimed is:

1. Computer-aided method for recording and billing of services during roaming of a mobile IP node in heterogeneous WLANs, comprising:

accessing, via a mobile IP node, an access point of a WLAN within a basic service area of the WLAN by a wireless interface, the basic service area of the WLAN including one or more access points assigned to an access server;

receiving, by the mobile IP node, a request from the access server to transmit to the access server an IMSI stored on a SIM card of the mobile IP node, the IMSI of the mobile IP node being stored in a database of a SIM-RADIUS module;

transmitting, from the mobile IP node the IMSI stored on the SIM card of the mobile IP node, to a SIM user database and a SIM gateway allowing the SIM-RADIUS module to supplement a user specified logical IP data channel of the WLAN toward corresponding GSM data for signal and data channels of a GSM network, at least one of an authentication or service authorization of the mobile IP node being carried out at one of an HLR or a VLR of the GSM network based on the IMSI of the SIM card of the mobile IP node;

employing a billing gateway interface to enable a billing module to access the access server, the billing module receiving a first call detail record of the mobile IP node transmitted from the access server, the billing gateway interface including an assigned billing management database with a configuration profile for each access server;

transmitting, to a proxy module, a second call detail record of the mobile IP node, the proxy module capturing data relating to at least one of an identity of the mobile IP node, a duration of the obtained service, or a provider of the obtained service;

transferring, from the proxy module to the billing module, the captured data;

generating, in the billing module, TAP files corresponding to service obtained by the mobile IP node based on the transferred captured data from the proxy module and the first call detail record;

transmitting the generated TAP files, together with billing instructions, from the billing module to a clearing module, the billing instructions including at least one of user-specific or service-provider-specific billing data, the clearing module at least one of billing the service obtained by the user to a provider of a fixed network or transmitting the TAP files to a GSM service provider for billing.

2. Computer-aided method according to claim 1, wherein the first call detail record is created based at least on the IP address of the mobile IP node and identification of the service provider whose service was obtained by the mobile IP node.

3. Computer-aided method according to claim 1, wherein a data stream of the mobile node, when accessing the WLAN from the access point, is directed by a mobile radio network service provider.

4. Computer-aided method according to claim 1, wherein the TAP files are created based on at least one of Inter Operator Tariffs and Public Mobile Network TAP identification codes.

5. Computer-aided method according to claim 1, wherein the billing instructions are retrieved from a billing management database including at least one of IP addresses or GSM identification of at least one of the users or service providers.

6. Computer-aided method according to claim 5, wherein the billing management database includes at least one of Inter Operator Tariffs and Public Mobile Network TAP identification codes.

7. Computer-aided method according to claim 1, wherein the first call detail record of the mobile IP node is transmitted from the access server to the billing module, the first call detail record being SIM-based, and the second call detail record is transmitted from the access server to the proxy module, the second call detail record being IP-based.

8. System for recording and billing services during roaming of a mobile IP node in heterogeneous WLANs, comprising:
- at least one WLAN with a basic service area in each case, which basic service area of the WLAN at least one access point assigned to an access server, the at least one access point including a wireless interface for communication with at least one mobile IP node;
- at least one mobile IP node including a SIM card for storing an IMSI;
- at least one access server comprising:
  - a SIM-RADIUS module;
  - a SIM user database, and
  - a SIM gateway module for user-specific supplementation of a logical IP data channel of the WLAN toward corresponding GSM data for signal and data channels of a GSM network, at least one of authentication or service authorization of the mobile IP node being carried out at one of an HLR or a VLR of the GSM network, based on the IMSI of the SIM card of the mobile node;
  - a billing module with a billing gateway interface for access to multiple access servers, at least one first call detail record of the mobile IP node being receivable by the billing module, and the billing gateway interface including a billing management database with configurations of individual access servers; and
- a proxy module for downloading a second call detail record of the mobile IP node from the at least one access server, the proxy module capturing at least one of an identity of the mobile IP node a duration of the obtained service, and a provider of the obtained service to be passed on to the billing module,
- wherein the billing module generates TAP files corresponding to service obtained by the mobile IP node based on the captured data, the TAP files being transmittable, together with billing instructions, to a clearing module, the billing instructions including at least one of user-specific or service-provider-specific billing data.

9. System according to claim 8, wherein, in the access server, the second call detail record is created based at least on an IP address of the mobile IP node and identification of the service provider whose service was obtained by the mobile IP node.

10. System according to claim 8, wherein a data stream of the mobile IP node during access to the WLAN from the access point is directed by a mobile radio network service provider.

11. System according to claim 8, wherein the TAP files include information relating to at least one of Inter Operator Tariffs and Public Mobile Network TAP identification codes.

12. System according to claims 8, wherein the billing management database includes at least one of IP addresses or GSM identification of at least one of the users or service providers.

13. System according to claim 8, wherein the billing management database includes at least one of Inter Operator Tariffs and Public Mobile Network TAP identification codes.

14. System according to claim 8, wherein the first call detail record of the mobile IP node is transmitted to the billing module, the first call detail record being SIM-based, and the second call detail record is transmitted to the proxy module, the second call detail record being IP-based.

* * * * *